United States Patent
Mickeleit

(10) Patent No.: US 7,613,798 B2
(45) Date of Patent: Nov. 3, 2009

(54) METHOD FOR PROCESSING PRINTING ORDERS IN SERVER-BASED NETWORKS, AND CORRESPONDING SERVER-BASED NETWORK

(75) Inventor: Carsten Mickeleit, Berlin (DE)

(73) Assignee: Thinprint GmbH, Berlin (DE)

( * ) Notice: Subject to any disclaimer, the term of this patent is extended or adjusted under 35 U.S.C. 154(b) by 313 days.

(21) Appl. No.: 10/470,137

(22) PCT Filed: Jan. 29, 2002

(86) PCT No.: PCT/DE02/00364

§ 371 (c)(1),
(2), (4) Date: Dec. 4, 2003

(87) PCT Pub. No.: WO02/061569

PCT Pub. Date: Aug. 8, 2002

(65) Prior Publication Data
US 2004/0122932 A1    Jun. 24, 2004

(30) Foreign Application Priority Data
Jan. 29, 2001    (DE)    ................................. 101 05 648

(51) Int. Cl.
*G06F 15/173*    (2006.01)
*G06F 3/12*    (2006.01)
(52) U.S. Cl. ...................... 709/223; 358/1.15
(58) Field of Classification Search ......... 709/216–219, 709/222–227, 201–203, 246; 358/1.11–1.15, 358/1.16, 1.9
See application file for complete search history.

(56) References Cited

U.S. PATENT DOCUMENTS

| | | | | |
|---|---|---|---|---|
| 6,313,920 B1 * | 11/2001 | Dresevic et al. | ............ | 358/1.11 |
| 6,484,933 B1 * | 11/2002 | Zimmerman et al. | ........ | 235/375 |
| 6,711,294 B1 * | 3/2004 | Hamzy et al. | ................ | 382/232 |
| 6,825,941 B1 * | 11/2004 | Nguyen et al. | ............. | 358/1.15 |
| 6,915,327 B1 * | 7/2005 | Tuli | ........................... | 709/203 |
| 7,061,635 B1 * | 6/2006 | Wanda et al. | ............... | 358/1.15 |

(Continued)

FOREIGN PATENT DOCUMENTS

EP    0924597 A2    6/1999

(Continued)

*Primary Examiner*—Yasin M Barqadle
(74) *Attorney, Agent, or Firm*—Norris McLaughlin & Marcus, PA

(57) ABSTRACT

To create a method for processing print jobs in server-based networks as well as a relevant network, in which the disadvantages of the methods of print processing according to the current technical status can be avoided, it is suggested that a print job which has been generated from an application on the network's server in EMF format be furnished with an identification which lets the print job seem to be in RAW format; that the print job in pretended RAW format be sent to an end device in the network, where the identification is removed and finally the conversion of the EMF file into the print device-specific RAW format is executed with a local printer driver, or that the print job furnished with the identification is forwarded to a print server, where the identification is removed and finally the conversion of the EMF file into the print device-specific RAW format is executed with a local printer driver, and the RAW file is finally sent to the end device.

26 Claims, 3 Drawing Sheets

U.S. PATENT DOCUMENTS

| | | | |
|---|---|---|---|
| 7,106,465 B1 * | 9/2006 | Simpson et al. | 358/1.15 |
| 7,130,068 B1 * | 10/2006 | Ohta | 358/1.15 |
| 2002/0065873 A1 * | 5/2002 | Ishizuka | 709/203 |
| 2002/0078160 A1 * | 6/2002 | Kemp et al. | 709/208 |
| 2002/0101600 A1 * | 8/2002 | Sabbagh et al. | 358/1.13 |
| 2004/0098506 A1 * | 5/2004 | Jean | 709/245 |

FOREIGN PATENT DOCUMENTS

| | | |
|---|---|---|
| JP | 6274294 A | 9/1994 |
| JP | 11327821 A | 11/1999 |
| JP | 2000163225 A | 6/2000 |

* cited by examiner

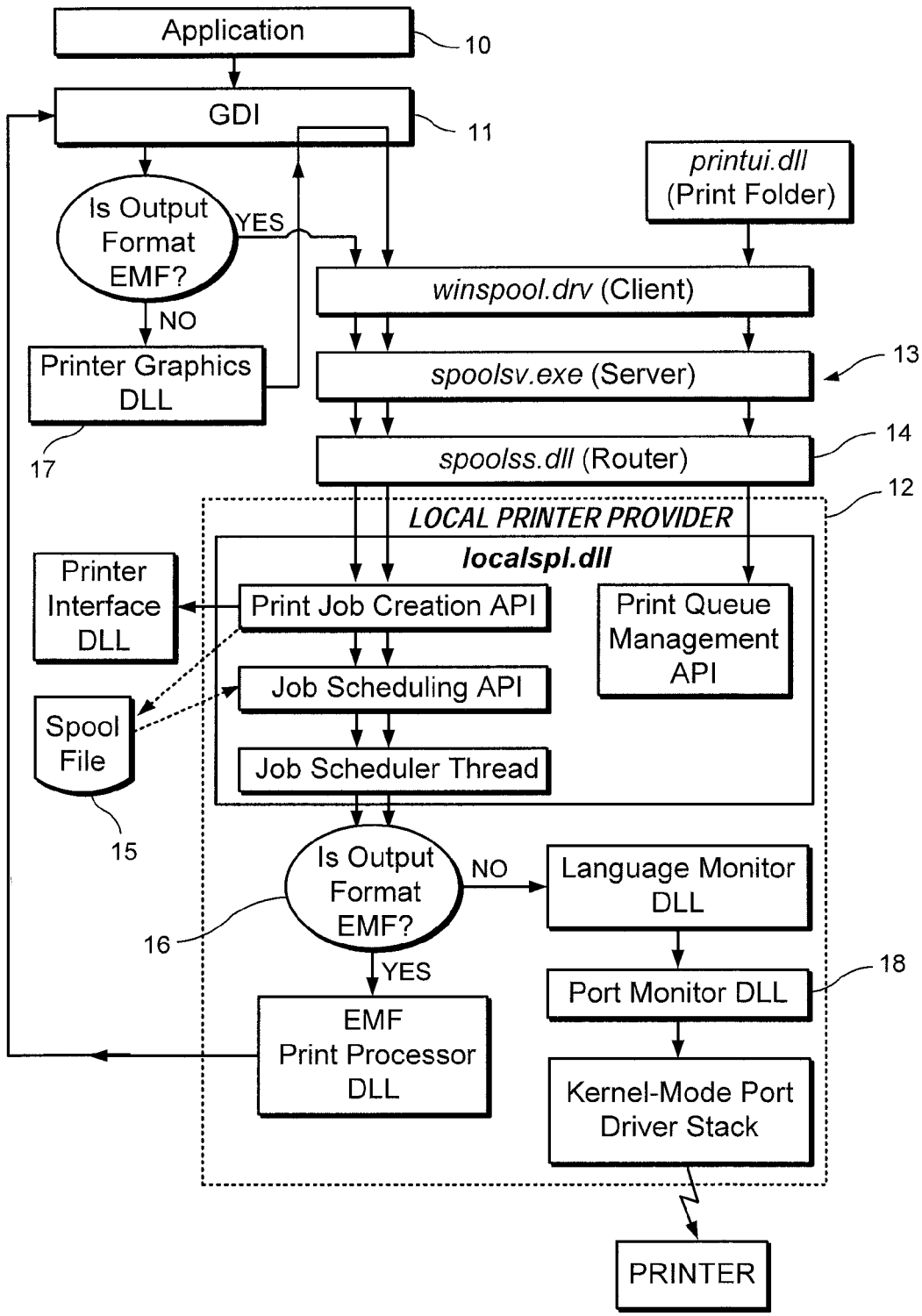
F I G. 1

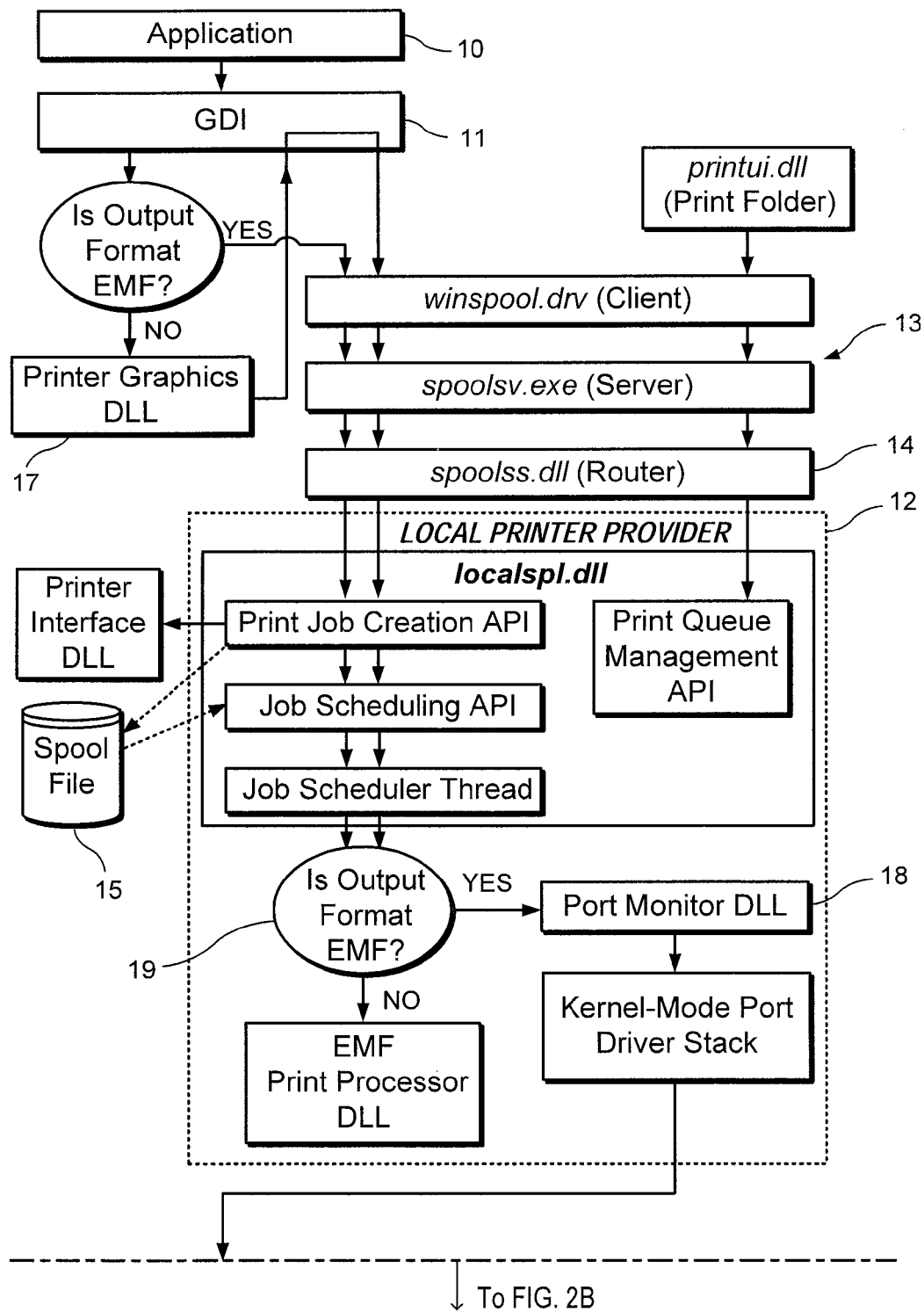
F I G. 2A

METHOD FOR PROCESSING PRINTING ORDERS IN SERVER-BASED NETWORKS, AND CORRESPONDING SERVER-BASED NETWORK

The invention relates to a method to process print jobs in server-based networks as well as a server-based network.

BACKGROUND

Server-based network architectures—unlike conventional file servers or client/server architectures—can be identified in that applications are not run locally on end devices, but centrally on a server. Solely the presentation occurs on the local end device. Besides screen presentation exists the presentation form of the printout, which can also be executed on the local end device. Thus print jobs in server-based architectures can be printed over locally connected print devices or network print devices, which in turn can also be configured as locally networked or as networked remote devices, whereby creation of the print job is always executed on the server.

Creation of a print job in named networks based on MS Windows operating systems always occurs in three phases, which are completed on the server:
1. Application-specific creation of page representation, with which the print job is converted to an EMF (enhanced Metafile) file format.
2. Onscreen preview option using the EMF file of the page which is later to be printed.
3. Printer-specific preparation (rendering) in which the EMF file is converted to a RAW file using a device-specific printer driver.

The rendered print job is finally sent to the end device and there printed out.

Different problems arise during print job rendering [processing] in server-based networks. All printer devices available on the client side must, for example, be supported; in other words, a relevant printer driver must be installed on the server for every print device. A multiplicity of printer drivers leads to conflicts.

No driver exists for terminal servers (NT or 2000) for print devices, which communicate bi-directionally, so that these cannot be used in server-based networks.

For the user of an end device, independent installation of a local print device is as a rule only possible if the driver for the print device is already available on the server, thereby supporting the installation.

To avoid such problems, it is known to install a .pdf writer as default printer on the server. Print jobs from any application are converted into an EMF file as usual, and then given to the .pdf writer. This application creates a .pdf document, which is sent to the end device. On the end device, this data format can be viewed using a .pdf viewer or forwarded with help from the installed printer driver to a port and/or print device for printout.

Although this process indeed avoids printer driver conflicts, it nevertheless causes other disadvantages, which could outweigh the intended advantage. A loss of quality is generally unavoidable when diverting the data over the .pdf writer, so that this process is excluded for some applications. Furthermore, dedicated print servers and network printers are not supported by this method. There is no streaming, i.e. transmission of the file to be printed in smaller packets, so that printing the file requires much time. To use this method, each end device requires an Acrobat Reader, which further decreases the already low capacity of the end devices in such network architectures. Ultimately, this method causes a high consumption of both server and client CPU resources.

SUMMARY

It is therefore the object present of the invention to establish a method for processing print jobs in server-based networks as well as a relevant network in which the disadvantages of the methods of print processing according to the state of art can be avoided.

This object is resolved with the features from claim 17 and/or 31.

The invention provides a method of processing print jobs in server-based networks in which a print job, which has been generated from an application on a server is furnished in EMF format with an identification that lets it seem to be in RAW format. The print job is sent to an end device (client) in this deceptive RAW format. There, the identification is removed and the EMF file is converted with a local printer driver into the print device-specific RAW format, so that the print job can be printed from a local print device.

Alternatively, the method can be arranged so that within the context of processing print jobs on the server, print jobs can also be transmitted in EMF format to the client, where they are then converted with a relevant printer driver.

Furnishing the print job in EMF format with an identification as RAW format as "camouflage" occurs immediately; for example, as part of processing by the print processor; or by a universal printer driver provided by the invention which does not undertake print device-specific rendering, but instead attaches the identification as well as other information, e.g. relevant to formatting, to the print job. It is also possible that the identification is immediately attached while the universal printer driver functions but only attaches the additional information.

With the method provided by the invention, installation of a print device-specific printer driver is advantageously only required on a relevant end device. On the server, depending on the form of execution, only the universal printer driver, which is independent of application/print device, must be installed.

In an advantageous arrangement of the method provided by the invention, the print job disguised as RAW format is sent to a print server on which the actual generation with removal of the identification of the RAW file occurs, which is first then sent to the end device to effect print out from a local print device. Which printer driver will be targeted is first sent from the end device to the print server.

This arrangement of the method can also occur with print devices that are reachable over the internet, in that the RAW file is sent to them over the internet.

This arrangement of the method provided by the invention is intended for end devices, which are too feebly designed for a normal print process. The end device user is relieved of the necessities of administration and the print job can be generated individually for the print device configured to the end device. The server is also, appropriate to its tasks, relieved of the task of processing print jobs.

Transport of the EMF file between server and client can take place online, as file or stream, as well as offline, especially in the form of e-mails.

Another arrangement of the method provided by the invention exists therein, that some end devices have no print device connected to them; e.g., to enable printout from the next best printer found underway for the user of mobile devices. For this purpose the disguised EMF file is sent over a fax or mail server, which removes the identification and generates a fax or a mail, respectively, to a fax device or mailbox, whereby conversion to a .pdf file is possible if needed.

In a form of execution for the circumstance that the client device is not capable of displaying the print job on its display screen, the method is to send a bitmap, which depicts the pages parallel to print job transmission, because as a rule bitmaps can be issued on very end device with graphic display options.

To keep the amount of data to be sent as small as possible, the e.g. mobile client device sends its display information to the server. This then creates from the document a bitmap, which precisely corresponds to the display options and the display screen. Thus only the truly necessary data amount is created and transmitted.

The method likewise provides that with help from a so-called viewer component, the print job can be viewed on the client computer before printout. In this way this method can also be used for report systems, which have no visualization available on the client machine. This is generally the case where conventional report systems are to be used in web architectures.

It is furthermore preferentially provided for that the EMF print job be saved in compressed form and used as document exchange format. To do so only the document and the client application together with the viewer are made available to the client. The viewer decompresses the data and displays the EMF file. The data can then be further processed with any local printer driver installed on the client. Conversion of the EMF file to the print device-specific RAW format then occurs with a local printer driver, so that the print job can be issued from a local print device.

Print job transmission from server to client can also, if preferred, take place in compressed form.

The server-based network provided by the invention is furnished with a MS Windows operating system and consists of a server, a multitude of end devices, preferentially in the form of PCs, and directly or indirectly connected print devices or similar, whereby data is stored on the server which gives print jobs in EMF format an identification that lets them appear to be in RAW format, and whereby data is stored on the end device which removes the identification from the print jobs so that the print jobs can be processed by a local printer driver which is found in the end device.

Preferentially, the module for furnishing print jobs with an identification is arranged within the framework of the print processor or stored on the server in the form of a universal printer driver provided by the invention for all applications and print devices in the network, whereby the universal printer driver provided by the invention can only be passed for receipt of additional information and the identification is added in the print processor.

In one form of execution of the network provided by the invention, between the server and the end devices is situated a print server, a fax server, or a mail server, on which data is stored that removes the identification from print jobs that have been sent by the server in EMF format with an identification which lets them seem to be in RAW format. Lastly occurs processing with the local printer driver or the generation of a fax or mail, respectively. After processing comes transmission of the relevant file to the end device, the fax, or the mailbox, whereby data found on the end device with information about the type of print device or processing with a printer driver from same is sent to the print server. The print device can be connected to the network over the internet.

A client machine can preferentially be positioned in such a way that it receives print jobs from any servers as e-mail and can print these out on any printout devices (printer, fax, archive). The form of printout can thereby be specified in the e-mail's subject line.

Additional advantageous designs are characterized in the sub-claims.

BRIEF DESCRIPTION OF THE DRAWINGS

The invention will be illustrated in more detail below based on charts. They depict:

FIG. 1 in a chart, the processing of a print job according to state of art, and

DETAILED DESCRIPTION OF THE INVENTION

Figure 2B:
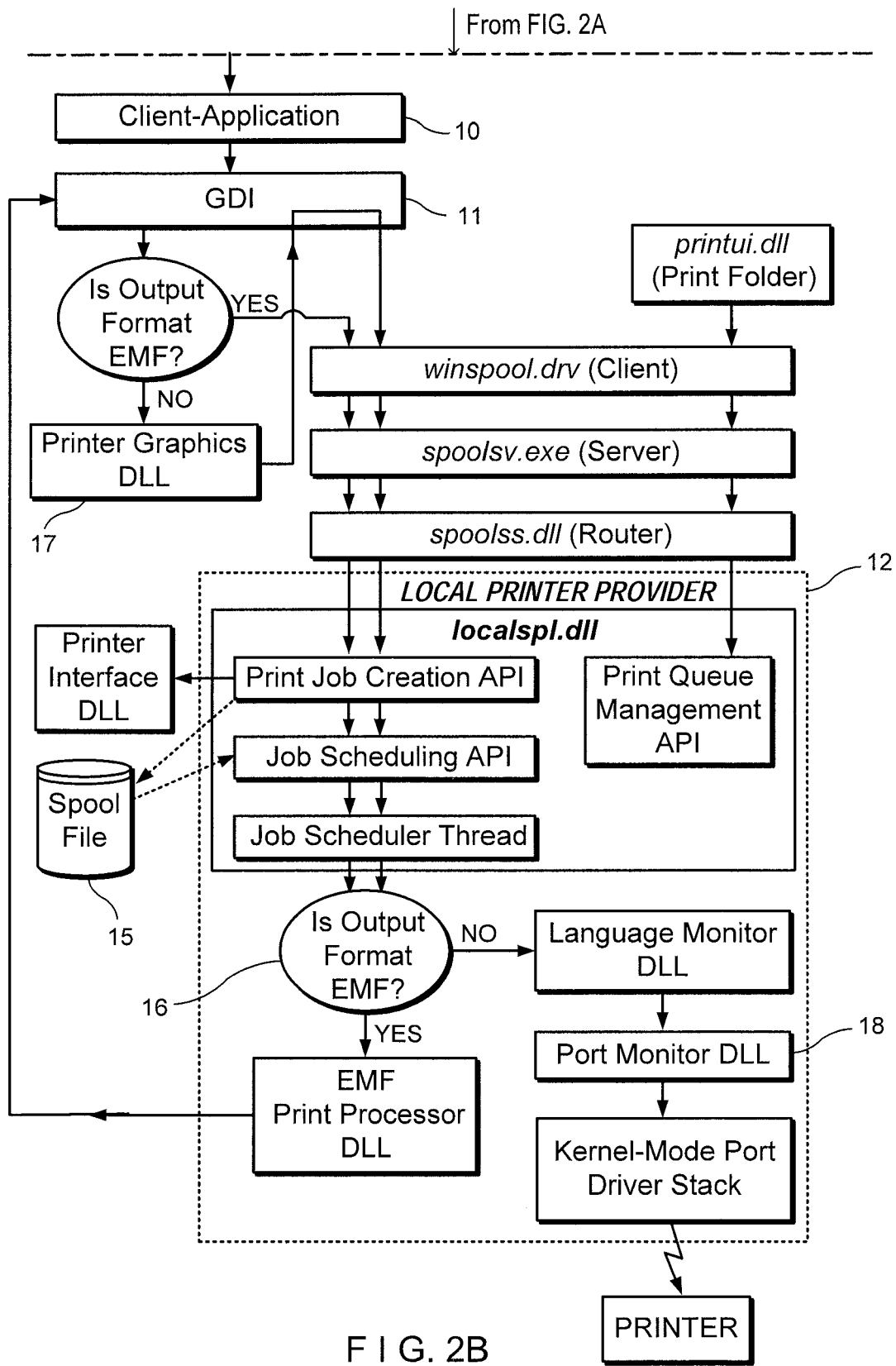
FIG. 2 in a chart, the processing of a print job according to a form of execution of the method provided by the invention.

FIG. 1 depicts a print process according to current technical status under MS Windows. Through an arbitrary application 10 the generation of a print job is initiated in that it invokes the functions of the graphics driver interface (GDI) 11. Independently of the printout format of the print job through the application 10, the local print provider 12 creates, once the print job has passed through a spooler process 13 and a router 14, a so-called spool file 15 to keep the time for printing as short as possible for the application 10. Lastly this spool file 15 is read by the print processor 16 and if the print job is available in EMF format, the spool file 15 is sent through the print processor 16 back to the GDI 11. The GDI 11 then creates a RAW file with help from the printer graphics DLL 17. This file thereupon travels through the local print provider 12 without repeated spooling. Insofar as the print job is available as RAW file according to spool file 15, it is sent without again accessing the GDI 11 over the port monitor 18 to the printer or in the network to the client and its printer.

In the method provided by the invention according to FIG. 2, which makes use of the system in FIG. 1, the process according to current technical status is modified in such a way that after running through the local print provider 12 an EMF print job runs through an invention-specific print processor 19 disguised as RAW data and is then forwarded over the port monitor 18 to the client's application. Through the client application 10 this job is then again introduced into the client's local Windows process, as if the print job had been generated on the client and not on the server. Consequent processing is then executed by the client according to the method of FIG. 1.

For the sake of better overview only the elements essential to the method provided by the invention have been given reference marks in the above described FIGS. 1 and 2.

| Reference mark list | |
|---|---|
| Application | 10 |
| GDI | 11 |
| Print provider | 12 |
| Spooler process | 13 |
| Router | 14 |
| Spool file | 15 |
| Print processor | 16 |
| Printer graphics DLL | 17 |
| Port monitor | 18 |

The invention claimed is:

1. A method for processing a print job on a server-based network comprising:
   generating a print job on a network server in EMF format via a network server-based application on the network,
   at the server, attaching a deceptive RAW formatting identification to the print job, wherein, based on the deceptive RAW formatting identification, the print job appears to be in RAW format a server-based printer driver installed on the server into permitting the server-based printer driver to transmit the print job;

transmitting the print job with the deceptive RAW formatting identification from the server to an end device on the network;

at the end device, removing the deceptive RAW formatting identification from the print job to generate an EMF format print job file; and converting the EMF format print job file, using at least one printer-specific local printer driver, into a printer device-specific RAW format.

2. The method of claim 1, wherein the at least one printer-specific local printer driver resides on a print server, the method further comprising:

transmitting the convened print job file from the printer driver to a client end device.

3. The method of claim 1, wherein the server-based printer driver is a printer-independent printer driver, wherein the end device is connected to a local printer and the printer-specific local printer driver corresponds to the local printer and converts the EMF format print job file into the printer device-specific RAW format.

4. The method of claim 3, wherein the printer-independent printer driver does not perform printer device-specific processing of the print job.

5. The method of claim 3, wherein the printer-independent printer driver attaches additional information to the print job.

6. The method of claim 1, wherein a print processor on the server attaches the identification to the print job.

7. The method of claim 6, wherein a printer-independent printer driver on the server attaches additional information to the print job.

8. The method of claim 1, wherein the print job is transmitted to the end device at least one of online, as a file, as a stream and offline.

9. The method of claim 8, wherein the offline transmitting is in the form of an e-mail.

10. The method of claim 8, wherein the end device is an e-mail or fax server, generates an e-mail or fax from the convened print job file and transmits the converted print job file to an e-mailbox or fax device on the network, respectively.

11. The method of claim 1 further comprising:

transmitting to the end device, in parallel with the print job having the deceptive RAW formatting identification and for display on the end device, a bitmap corresponding to a page of the print job.

12. The method of claim 11 further comprising:

transmitting display information from the end device to the server; and creating the bitmap at the server based on the display information, wherein the bitmap corresponds to display options and display format of the end device.

13. The method of claim 1 further comprising:

saving the print job with the deceptive RAW formatting identification in compressed form at the server; and transmitting the print job with the deceptive RAW formatting identification and formatted for document exchange to the end device, wherein the end device includes an application with a viewer for displaying the print job file.

14. The method of claim 1 further comprising:

transmitting the print job with the deceptive RAW formatting identification in compressed form.

15. A server-based network comprising:

a server coupled to a plurality of end devices, the server comprising means for attaching deceptive RAW formatting identification to a print job formatted in EMF format and generated by an application on the server, wherein, based on the deceptive RAW formatting identification, the print job appears as RAW format to a network printer driver installed on the server and deceives server-based driver into allowing the server to transmit the print job to a first of the end devices; and the first end device comprising means for removing the deceptive RAW formatting identification from the print job to generate an EMF format print job file, wherein the print job file is convertible into a printer device-specific RAW format using at least one printer-specific printer driver.

16. The network of claim 15, wherein the first end device is a local print server including the printer- specific printer driver, wherein the printer- specific printer driver comprises means for converting the print job file into the printer device-specific RAW format and wherein the print server comprises means for transmitting the converted print job file to a client end device.

17. The network of claim 15, wherein the network printer driver is a printer-independent printer driver, wherein the printer-independent printer driver comprises means for attaching the deceptive RAW formatting identification to the print job and transmitting the print job including the deceptive RAW formatting identification to the first end device, wherein the first end device comprises means for directing the printer-specific printer driver to convert the print job file into the printer device-specific RAW format.

18. The network of claim 17, wherein the printer-independent printer driver does not perform printer device-specific processing on the print job.

19. The network of claim 17, wherein the printer-independent printer driver attaches additional information to the print job.

20. The network of claim 15, wherein a print processor on the server attaches the identification to the print job.

21. The network of claim 20, wherein a printer-independent printer driver on the server attaches additional information to the print job.

22. The network of claim 15, wherein the server comprises means for transmitting the print job with the deceptive RAW formatting identification to the first end device at least one of online, as a file, as a stream and offline.

23. The network of claim 15, wherein the first end device is an e-mail or fax server, an e-mail or fax from the converted print job file and means for transmitting the converted print job file to an e-mailbox or fax device on the network, respectively.

24. The network of claim 15, wherein the server comprises means for transmitting to the first end device, in parallel with the print job having the RAW formatting identification, a bitmap for display on the first end device and corresponding to a page of the print job.

25. The network of claim 24, wherein the first end device comprises means for transmitting display information to the server, and wherein the bitmap corresponds to display options and display format of the first end device.

26. The network of claim 15, wherein the server comprises means for storing the print job with the RAW formatting identification in compressed form; and wherein the server comprises means for formatting the print job with the RAW formatting identification for document exchange and means for transmitting the document exchange formatted print job to the first end device, wherein the first end device includes an application with a viewer for displaying the print job file.

* * * * *